(12) United States Patent
Duerdodt et al.

(10) Patent No.: US 9,385,804 B2
(45) Date of Patent: Jul. 5, 2016

(54) TRANSMISSION UNIT AND A METHOD FOR TRANSMITTING DATA

(75) Inventors: Christian Duerdodt, Bochum (DE);
Gerhard Eichiner, Munich (DE);
Burkhard Neurauter, Linz (AT);
Thomas Puehringer, Pfarrkirchen (AT);
Irene Schuster, Kronstorf (AT);
Dietmar Wenzel, Munich (DE)

(73) Assignee: Intel Deutschland GmbH, Neubiberg (DE)

( * ) Notice: Subject to any disclaimer, the term of this patent is extended or adjusted under 35 U.S.C. 154(b) by 2602 days.

(21) Appl. No.: 12/014,641

(22) Filed: Jan. 15, 2008

(65) Prior Publication Data
US 2009/0180462 A1    Jul. 16, 2009

(51) Int. Cl.
*H04J 3/00* (2006.01)
*H04B 7/185* (2006.01)

(52) U.S. Cl.
CPC ........ *H04B 7/18517* (2013.01); *H04B 7/18591* (2013.01)

(58) Field of Classification Search
CPC ................. H04B 7/18517; H04B 7/18591
USPC .................................. 370/310, 236
See application file for complete search history.

(56) References Cited

U.S. PATENT DOCUMENTS

| | | | |
|---|---|---|---|
| 6,084,868 A | 7/2000 | Piirainen | |
| 6,339,588 B1 * | 1/2002 | Katsuragawa | 370/311 |
| 6,832,104 B2 * | 12/2004 | Sakurai | 455/558 |
| 6,832,368 B1 * | 12/2004 | Zimowski | 717/139 |
| 6,879,575 B1 * | 4/2005 | Suzuki et al. | 370/342 |
| 2002/0198024 A1 * | 12/2002 | Sakurai | 455/558 |
| 2004/0109427 A1 * | 6/2004 | Sydon et al. | 370/337 |
| 2005/0002323 A1 * | 1/2005 | Hadad | 370/203 |
| 2005/0025088 A1 | 2/2005 | Choi | |
| 2005/0136843 A1 * | 6/2005 | Watabe | 455/67.11 |
| 2006/0059280 A1 * | 3/2006 | Gossmann et al. | 710/58 |
| 2007/0011555 A1 * | 1/2007 | Kim et al. | 714/749 |
| 2008/0125131 A1 * | 5/2008 | Guo | 455/446 |
| 2008/0167055 A1 * | 7/2008 | Willey et al. | 455/458 |
| 2011/0077017 A1 * | 3/2011 | Yu et al. | 455/452.1 |

FOREIGN PATENT DOCUMENTS

WO    WO 2006102922 A1    10/2006

* cited by examiner

*Primary Examiner* — Jay P Patel
(74) *Attorney, Agent, or Firm* — Eschweiler & Associates, LLC

(57) ABSTRACT

A baseband unit for a radio communication system based on time division multiple access includes a data processing unit configured to generate a configuration macro. The configuration macro includes information about a temporal position of a particular time slot within a time frame, wherein the particular time slot has a time duration corresponding to the total time duration of an integer number of consecutive data symbols.

21 Claims, 4 Drawing Sheets

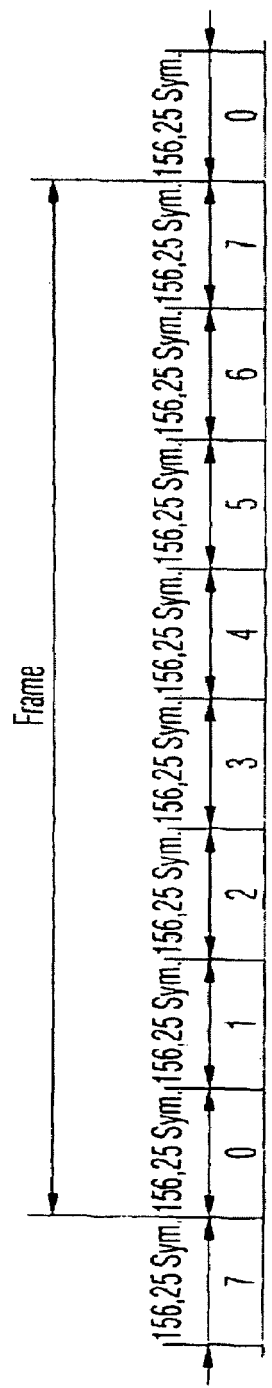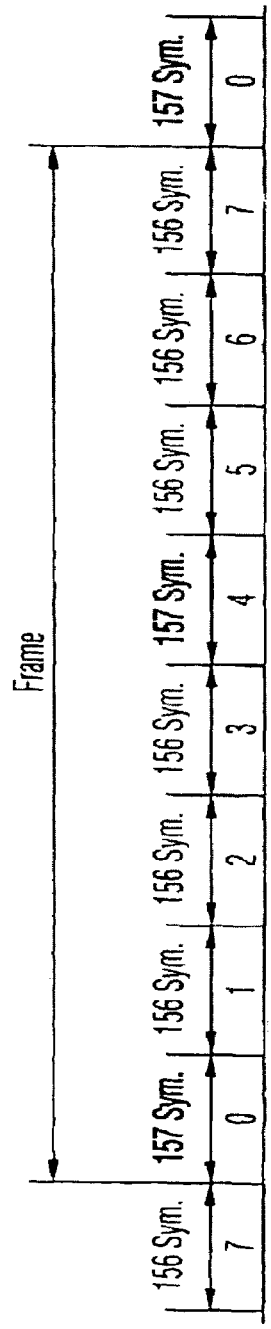

TRANSMISSION UNIT AND A METHOD FOR TRANSMITTING DATA

FIELD OF THE INVENTION

The present invention relates to a transmission unit for a radio communication system based on time division multiple access, a baseband unit for a radio communication system based on time division multiple access, and a method for transmitting data in a radio communication system based on time division multiple access.

BACKGROUND OF THE INVENTION

Generally speaking, there are two types of wireless systems: code division multiple access (CDMA)-based synchronous systems and time division multiple access (TDMA)-based asynchronous systems. The TDMA-based asynchronous system most widely used in Europe is the global system for mobile communications (GSM) system.

The GSM standard uses a time multiplex method in which the physical transmission channel is divided into time slots of a time duration corresponding to 156.25 consecutive data symbols, wherein eight consecutive slots are assembled to one time frame. In an alternative of this GSM standard the symbol fractions of four consecutive time slots are assembled and added to the first one of the four time slots.

BRIEF DESCRIPTION OF THE DRAWINGS

Aspects of the invention are made more evident in the following detailed description of embodiments when read in conjunction with the attached drawing figures, wherein:

FIG. 1A shows a diagram for illustrating a GSM slot and frame timing according to one variant as provided in the GSM standard;

FIG. 1B shows a diagram for illustrating a further GSM slot and frame timing according to another variant as provided in the GSM standard;

DETAILED DESCRIPTION OF THE INVENTION

Figure 2:
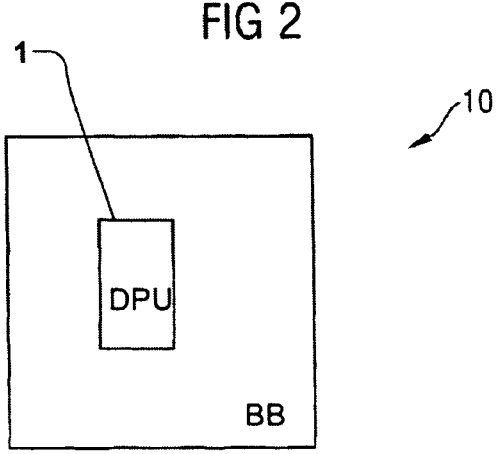
FIG. 2 shows a schematic representation of an embodiment of a baseband unit for a radio communication system based on time division multiple access.

The aspects and embodiments of the invention are now described with reference to the drawings, wherein like reference numerals are generally utilized to refer to like elements throughout. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of the specific details. In other instances, known structures and devices are shown in block diagram form in order to facilitate describing one or more aspects of the embodiments of the invention. The following description is therefore not to be taken in a limiting sense, and the scope of the invention is defined by the appended claims.

In the following, embodiments of a transmission unit and a baseband unit and a method for transmitting data are described, the embodiments being related to a radio communication system based on time division multiple access. It should be noted that the radio communication system can be any radio communication system which is based on or supports any sort or kind of time division multiple access like, for example, a GSM radio communication system or an EDGE radio communication system, or a GSM/EDGE radio communication system.

In the embodiments of a transmission unit there can be provided a baseband unit, a radio frequency unit, and an interface unit coupled between the baseband unit and the radio frequency unit. The interface unit can be any interface unit suitable to pass data from the baseband unit to the radio frequency unit and/or to configure data from the baseband unit to be passed to the radio frequency unit. The interface unit can be an analog interface unit or a digital interface unit. The interface unit can, in one embodiment, be a digital serial interface unit based on the 3G DigRF standard. The interface unit can, however, also be another digital interface unit, like an interface unit based on the 3 wire standard.

The 3 wire standard has been developed as a quasi standard for communication via an interface comprising a three-conductor system with a clock line, a data line and an enable line. When it is intended to transfer data from a control module, which can be part of or identical with the baseband unit, to the radio-frequency module, the control module activates the enable line that is to say it sets the enable line to a specific predetermined value. The control module then emits a clock on the clock line and the data bits in serial form in synchronism with this on the data line. As soon as the enable line is reset again, the output of the clock pulses and data bits is stopped. The bits emitted during an active phase of the enable line form a so-called message.

The DigRF, in particular the DigRF V1.12 standard, has been developed because no data can be read on the data line from the radio-frequency module in the 3 wire standard. An interface based on the DigRF V1.12 standard comprises a control part and a data part. The data interface is required only when the baseband processor can not interchange the transmission data and received data in the normal analog form with the integrated radio-frequency module. However, an interface for the control information is always required. In precisely the same way as in the 3W standard, this interface in the DigRF standard is in the form of a bus with three lines, that is to say a clock line, a data line and an enable line. The protocol which is used to transfer data via the interface in the DigRF standard is, however, not the same as the protocol in the 3W standard.

The DigRF v3.07 standard comprises a control channel "logical channel type coding 0010" for transmission of configuration and control information. The standard further comprises a control channel "logical channel type coding 0001" which is used for synchronization purposes and which transports "Time Accurate Strobe Messages" (TAS messages).

A configuration macro or a configuration message for configuring or initiating particular actions in one of the device groups can have the form and syntax of a telegram. The contents and the syntax of the telegrams, which are used for configuring or initiating of actions in one of the device groups, are thus not prescribed by the standard. The basis of an error free communication between the baseband unit and the radio-frequency unit is the use of one and the same interpretation of the control telegrams on both sides. A control telegram allows, for example, the configuration of the transmission section of the radio-frequency unit for a predetermined number of consecutive transmission time frames.

Referring to FIG. 1A, there is shown a schematic representation of a diagram illustrating a GSM slot and frame time according to one variant of the GSM standard. The GSM standard uses a time multiplex method in which the physical transmission channel is sub-divided into time slots each having a length of 156.25 data symbols. A time frame is built-up of eight consecutive time slots. One slot consists of pay load and dummy symbols wherein the number of the payload symbols and the number of the dummy symbols is given by the standard. In general there are given five kinds of bursts, namely Normal Burst, Synchronization Burst, Frequency correction Burst, Access Burst, and Dummy Burst, wherein the Access Burst consists of 88 payload symbols and a guard period of 68.25 dummy symbols, and the Normal Burst consists of 156 payload symbols and a guard period of 8.25 dummy symbols.

When implementing the GSM slot and frame timing according to FIG. 1A, one challenge lies in the realization of the fractional symbol parts consisting of one quarter symbols. As an alternative the standard also allows to implement a GSM slot and frame timing as shown in the following FIG. 1B.

Referring to FIG. 1B, there is shown a schematic representation of a diagram depicting a GSM slot and frame timing according to another variant of the GSM standard. In this GSM slot and frame timing the quarter symbol parts of four consecutive time slots are put together and added to the first one of the four time slots so that the first one of the four time slots now has a length of 157 data symbols. The numbering of the time slots relates to the slot numbering within the frames. The first time slot (slot 0) and the fifth time slot (slot 4) within the frames have a length which is longer than the remaining time slots by one data symbol as the remaining time slots each have a length of 156 data symbols, respectively.

Referring to FIG. 2 there is shown a schematic representation of an embodiment of a baseband unit (BB) for a radio communication system based on time division multiple access. The baseband unit 10 comprises a data processing unit (DPU) 1 which is configured to generate a configuration macro, wherein the configuration macro comprises an information about a temporal position of at least one particular time slot within a time frame, the particular time slot having a time duration corresponding to the total time duration of an integer number of consecutive data symbols.

According to one embodiment thereof, the temporal position of the particular time slot is such that the particular time slot is the first time slot in a time frame.

According to a further embodiment, the configuration macro comprises information about the total number of consecutive time frames, each one of the time frames comprising an equal partitioning into time slots. The configuration macro, for example, contains information according to which six consecutive time frames have to be partitioned into time slots in one and the same way, in particular in a way that one and the same particular time slot with respect to its numbering has a length corresponding to the length of an integer number of consecutive data symbols.

Figure 3:
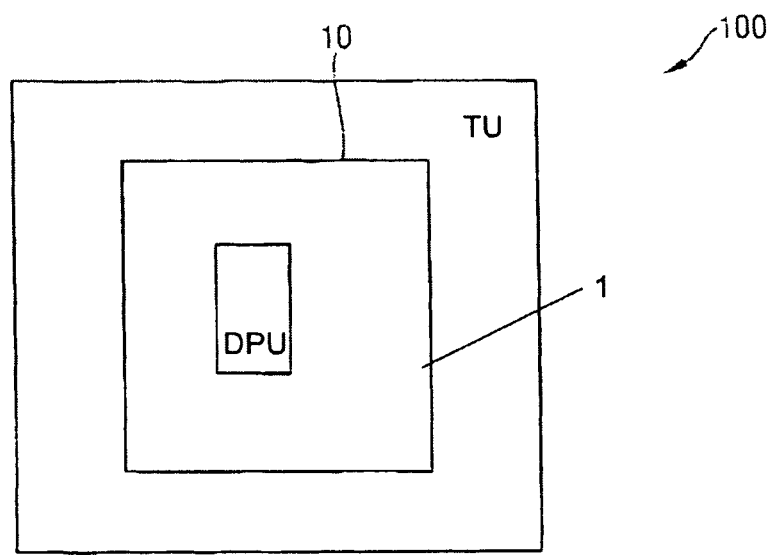
FIG. 3 shows a schematic representation of an embodiment of a transmission unit for a radio communication system based on time division multiple access.

Referring to FIG. 3, there is shown a schematic representation of an embodiment of a transmission unit (TU) for a radio communication system based on time division multiple access. The transmission unit (TU) 100 comprises a data processing unit (DPU) 1 which is arranged to generate a configuration macro, wherein the configuration macro comprises information about the temporal position of at least one particular time slot within a time frame, the particular time slot comprising a time duration corresponding to the total time duration of an integer number of consecutive data symbols.

According to an embodiment, the data processing unit (DPU) 1 can be part of a baseband unit (BB) 10 which is arranged within the transmission unit (TU) 100.

According to a further embodiment, the temporal position of the particular time slot is such that the particular time slot is the first time slot in a time frame.

According to a further embodiment, the configuration macro comprises information about the total number of consecutive time frames, wherein each one of the time frames comprises an equal partitioning into time slots.

Figure 4:
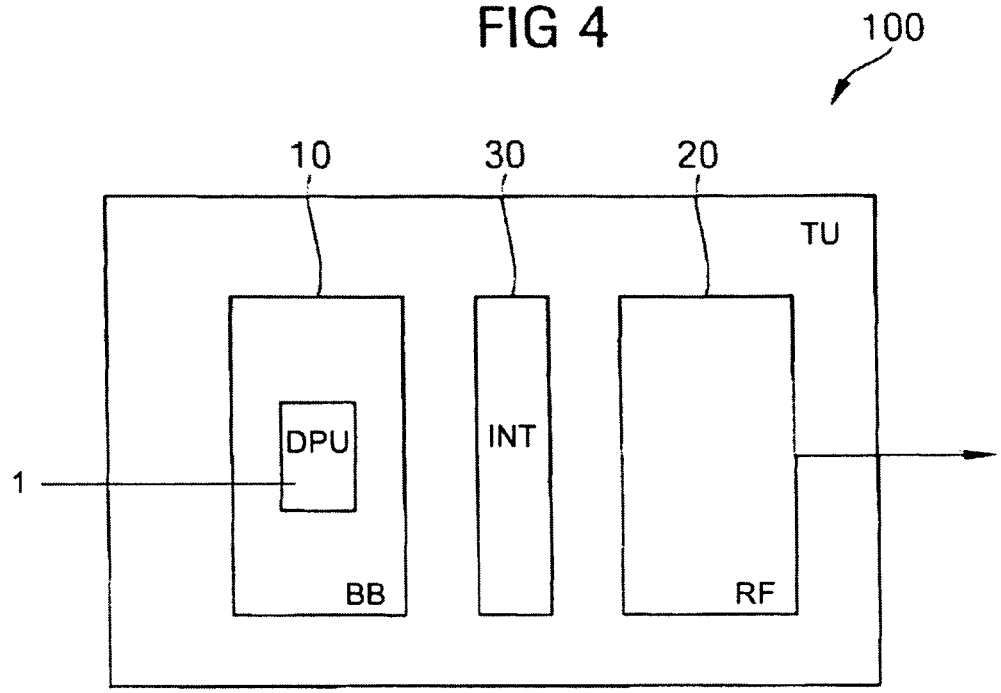
FIG. 4 shows a schematic representation of a further embodiment of a transmission unit for a radio communication system based on time division multiple access.

Referring to FIG. 4, there is shown a schematic representation of a further embodiment of a transmission unit (TU) 100 for a radio communication system based on time division multiple access. The transmission unit (TU) 100 comprises a baseband unit (BB) 10 comprising a data processing unit (DPU) 1 arranged to generate a configuration macro, wherein the configuration macro comprises information about the temporal position of at least one particular time slot within a time frame, wherein the particular time slot comprises a time duration corresponding to the total time duration of an integer number of consecutive data symbols. The transmission unit (TU) 100 further comprises a radio frequency (RF) unit 20 which is coupled to the baseband unit (BB) 10 by means of an interface unit (INT) 30.

According to an embodiment, the interface unit (INT) 30 comprises a digital interface unit. The digital interface unit can be configured to the 3W standard, the DigRF standard, or any other appropriate communication standard.

According to a further embodiment, the radio-frequency unit (RF) 20 is configured to receive the configuration macro from the baseband unit (BB) 10 via the interface unit (INT) 30, and to store the information about the temporal position of the particular time slot.

According to a further embodiment, the radio-frequency unit (RF) 20 is configured to determine a temporal position of at least one further time slot within the time frame, the further time slot having a duration corresponding to the duration of the particular time slot.

For example, referring again to the diagram of FIG. 1B, when the radio-frequency unit (RF) 20 receives information according to which the first time slot within the time frame should be a time slot having an integer number of data symbols, it may be configured to determine the temporal position of one further time slot also having a length of an integer number of data symbols. In particular the radio-frequency unit may be able to determine that the fifth time slot with slot number 4 should have the length of an integer number of data symbols.

The above described embodiments of a baseband unit (BB) and a transmission unit (TU) can be applied, for example, in a GSM, an EDGE, or a GSM/EDGE radio communication system. They allow compliance with the GSM specification in that the radio frequency unit, in particular the transmission section of the radio frequency unit (RF), performs data transmission strictly on the basis of the configuration macro which is in accordance with the GSM specification. In particular, the above described embodiments of a transmission unit and a baseband unit can be employed in General Packet Radio Service (GPRS) or Enhanced General Packet Radio Service (EGPRS) radio communication systems.

Figure 5:
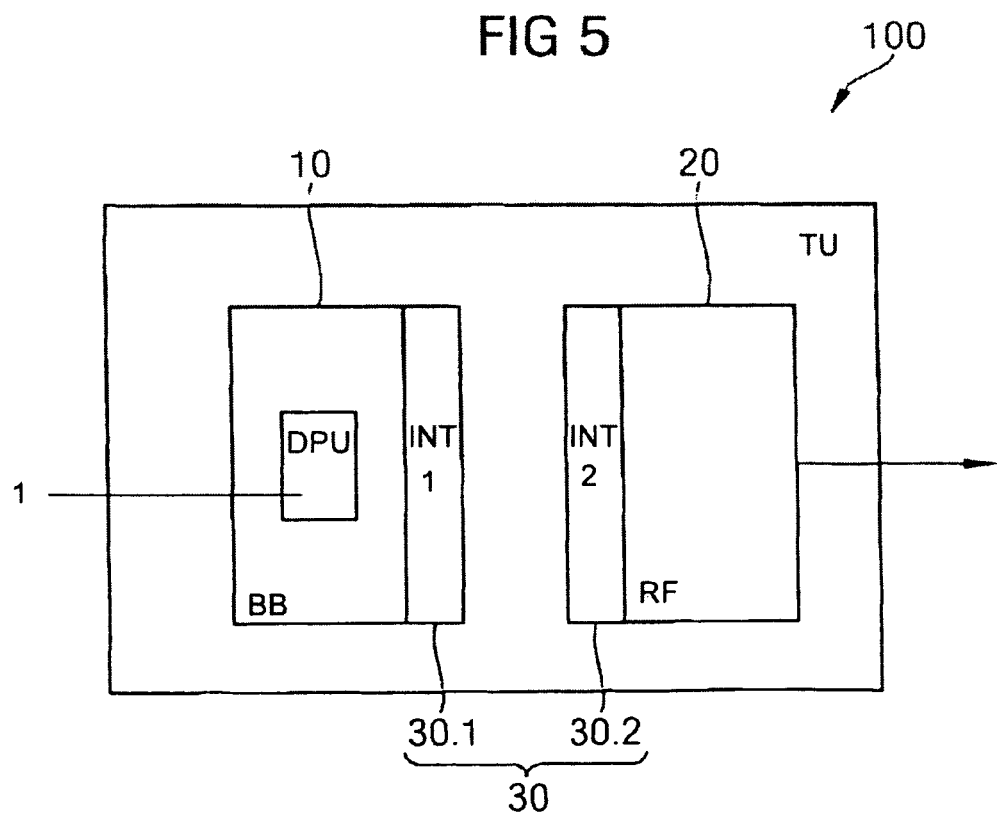
FIG. 5 shows a schematic representation of a further embodiment of a transmission unit for a radio communication system based on time division multiple access.

Referring to FIG. 5, there is shown a schematic representation of a further embodiment of a transmission unit (TU) for a radio communication system based on time division multiple access. The transmission unit (TU) 100 comprises a baseband unit (BB) 10 comprising a data processing unit (DPU) 1. The data processing unit (DPU) 1 is arranged to generate a configuration macro, wherein the configuration macro comprises information about the temporal position of at least one particular time slot within a time frame, wherein the particular time slot comprises a time duration corresponding to the total time duration of an integer number of data symbols. The transmission unit (TU) 100 also comprises a radio frequency unit (RF) 20 which is coupled to the baseband unit (BB) 10 by means of an interface unit 30. The interface unit 30 can, for example, be implemented as a DigRF, in particular a 3G DigRF interface unit. The interface unit 30 is comprised of a first interface sub-unit (INT1) 30.1 which is part of the baseband unit (BB) 10, and a second interface sub-unit (INT2) 30.2 which is part of the radio frequency unit (RF) 20.

Figure 6:
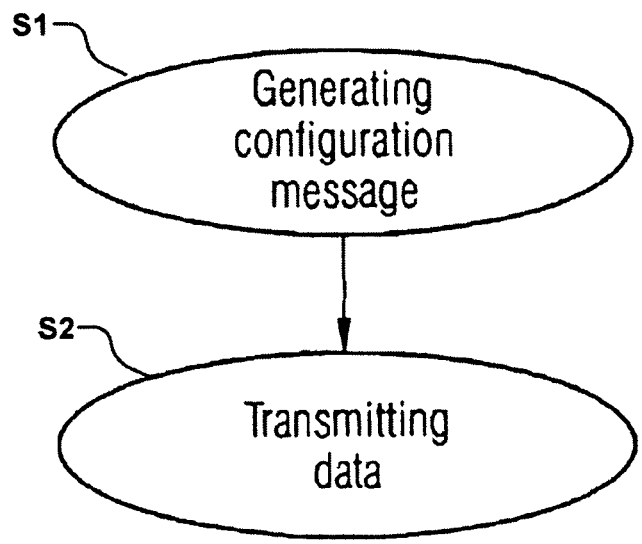
FIG. 6 shows a flow diagram of an embodiment of a method for transmitting data in a radio communication system based on time division multiple access.

Referring to FIG. 6, there is shown a flow diagram of a method for transmitting data in a radio communication system based on time division multiple access. The method comprises generating a configuration macro (s1), and transmitting data (s2). In the data transmission, at least one particular time slot within a time frame comprises a time duration corresponding to the total time duration of an integer number of consecutive data symbols, and the temporal position of the particular time slot is based on information contained in the configuration macro.

According to an embodiment of the method the temporal position of the particular time slot is determined to be the first time slot in a time frame.

According to a further embodiment, the configuration macro is generated in a data processing unit (DPU) of a baseband unit (BB) of the radio communication system.

According to a further embodiment, the configuration macro is transmitted to a radio frequency unit (RF) and the information about the temporal position of the particular time slot is stored in the radio-frequency unit (RF).

According to a further embodiment, the configuration macro is generated such that it contains information about the total number of consecutive time slots within one time frame.

According to a further embodiment, the method is carried out in a GSM, an EDGE, a GSM/EDGE, a GPRS, or an EGPRS radio communication system.

According to a further embodiment, the integer number is 157.

Figure 7:
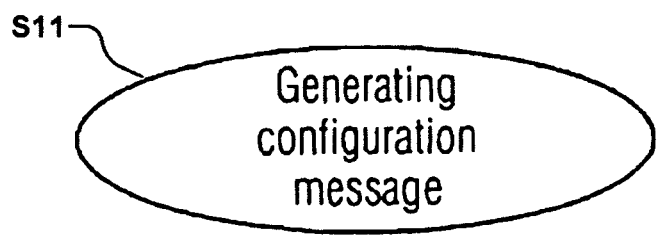
FIG. 7 shows a diagram of an embodiment of a method for preparing a transmission of data in a radio communication system based on time division multiple access.

Referring to FIG. 7, there is shown a diagram of an embodiment of a method for preparing a transmission of data in a radio communication system based on time division multiple access. The method comprises generating a configuration macro (s11), wherein the configuration macro comprises information about a temporal position of at least one particular time slot within a time frame, the particular time slot comprising a time duration corresponding to the total time duration of an integer number of consecutive data symbols.

According to an embodiment of the method, the temporal position of the particular time slot is determined to be the first time slot in a time frame.

According to a further embodiment of the method, the configuration macro is generated in a data processing unit (DPU) of a baseband unit (BB) of the radio communication system.

According to a further embodiment of the method, a temporal position of at least one further time slot within the time frame is determined, wherein the further time slot comprises a duration corresponding to the duration of the particular time slot. The temporal position of the further time slot can, for example, be determined in a radio-frequency unit (RF) which is connected to the baseband unit (BB). If, for example, the particular time slot is the first time slot of a time frame, the further time slot may be determined as the fifth time slot in the time frame.

According to a further embodiment of the method, the configuration macro further comprises information about the total number of consecutive time frames having equal partitioning into time slots. The total number may be determined, for example, as six consecutive time frames, wherein each of the six time frames has one and the same arrangement and partitioning into time slots.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A transmission unit for a radio communication system based on time division multiple access, comprising:
    a radio frequency unit; and
    a baseband unit coupled to the radio frequency unit and comprising a data processing unit configured to generate a configuration macro to be transmitted from the baseband unit to the radio frequency unit, wherein the configuration macro comprises information about a temporal position of a particular time slot within a time frame, the particular time slot comprising a time duration corresponding to a total time duration of an integer number of data symbols.

2. The transmission unit of claim 1, further comprising:
    an interface unit coupled between the baseband unit and the radio frequency unit.

3. The transmission unit of claim 2, wherein the interface unit comprises a digital interface unit.

4. The transmission unit of claim 3, wherein the digital interface unit is configured to transmit data according to the 3W standard or to the DigRF standard.

5. The transmission unit of claim 1, wherein the temporal position of the particular time slot is such that the particular time slot is the first time slot in a time frame.

6. The transmission unit of claim 1, wherein the radio frequency unit is configured to receive the configuration macro and store the information about the temporal position of the particular time slot.

7. The transmission unit of claim 6, wherein the radio frequency unit is configured to determine a temporal position of at least one further time slot within the time frame, the further time slot having a duration corresponding to the duration of the particular time slot.

8. The transmission unit of claim 1, wherein the configuration macro comprises information about the total number of consecutive time frames, each one of the consecutive time frames comprising an equal partitioning into time slots.

9. A baseband unit for a radio communication system based on time division multiple access, comprising:
a data processing unit coupled to a radio frequency unit and configured to generate a configuration macro to be transmitted from the baseband unit to the radio frequency unit, wherein the configuration macro comprises information about a temporal position of a particular time slot within a time frame, the particular time slot having a time duration corresponding to a total time duration of an integer number of consecutive data symbols.

10. The baseband unit of claim 9, wherein the temporal position of the particular time slot is such that the particular time slot is the first time slot in a time frame.

11. The transmission unit of claim 9, wherein the configuration macro comprises information about a total number of consecutive time frames, each one of the consecutive time frames comprising an equal partitioning into time slots.

12. A method for transmitting data in a radio communication system based on time division multiple access, comprising:
generating a configuration macro in a baseband unit;
transmitting the configuration macro from the baseband unit to a radio frequency unit; and
transmitting data from the radio frequency unit in accordance with one or more time frames, wherein at least one particular time slot within a time frame comprises a time duration corresponding to the total time duration of an integer number of consecutive data symbols and the temporal position of the particular time slot is based on information contained in the configuration macro.

13. The method of claim 12, wherein the temporal position of the particular time slot is determined to be the first time slot in a time frame.

14. The method of claim 12, further comprising:
generating the configuration macro in a data processing unit of the baseband unit.

15. The method of claim 12, further comprising:
transmitting the configuration macro to the radio frequency unit and storing the information about the temporal position of the particular time slot in the radio frequency unit.

16. The method of claim 12, further comprising:
generating the configuration macro such that it contains information about a total number of consecutive time frames, wherein each one of the consecutive time frames comprises an equal partitioning into time slots.

17. A method for preparing transmission of data in a radio communication system based on time division multiple access, comprising:
generating a configuration macro in a baseband unit, wherein the configuration macro comprises information about a temporal position of a particular time slot within a time frame, the particular time slot comprising a time duration corresponding to the total time duration of an integer number of consecutive data symbols; and
transmitting the configuration macro from a baseband unit to an RF unit; and
using the configuration macro in the RF unit to transmit data.

18. The method of claim 17, wherein the temporal position of the particular time slot is determined to be the first time slot in a time frame.

19. The method of claim 17, further comprising:
generating the configuration macro in a data processing unit of the baseband unit.

20. The method of claim 17, further comprising:
determining a temporal position of at least one further time slot within the time frame, the further time slot having a duration corresponding to the duration of the particular time slot.

21. The method of claim 17, wherein the configuration macro further comprises information about the total number of consecutive time frames having equal partitioning into time slots.

* * * * *